United States Patent
Lee et al.

(10) Patent No.: US 9,102,224 B2
(45) Date of Patent: Aug. 11, 2015

(54) HYBRID POWERTRAIN FOR VEHICLE

(71) Applicant: Hyundai Motor Company, Seoul (KR)

(72) Inventors: Jin Woo Lee, Ansan-si (KR); Jeong Heon Kam, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 169 days.

(21) Appl. No.: 13/665,216

(22) Filed: Oct. 31, 2012

(65) Prior Publication Data

US 2013/0239749 A1   Sep. 19, 2013

(30) Foreign Application Priority Data

Mar. 14, 2012   (KR) .................. 10-2012-0025835

(51) Int. Cl.

| | |
|---|---|
| *F16H 3/08* | (2006.01) |
| *B60K 6/36* | (2007.10) |
| *B60K 6/40* | (2007.10) |
| *B60K 6/48* | (2007.10) |
| *B60W 10/113* | (2012.01) |

(52) U.S. Cl.
CPC ... *B60K 6/36* (2013.01); *B60K 6/40* (2013.01); *B60K 6/48* (2013.01); *B60K 2006/4808* (2013.01); *B60W 10/113* (2013.01); *Y02T 10/626* (2013.01); *Y02T 10/6221* (2013.01); *Y10T 74/19056* (2015.01)

(58) Field of Classification Search
USPC ....................... 74/330, 331, 665 B
See application file for complete search history.

(56) References Cited

U.S. PATENT DOCUMENTS

| | | | | |
|---|---|---|---|---|
| 6,634,247 | B2 * | 10/2003 | Pels et al. ................ | 74/329 |
| 6,712,734 | B1 * | 3/2004 | Loeffler ................... | 477/5 |
| 6,755,089 | B2 * | 6/2004 | Hirt ......................... | 74/329 |
| 7,329,205 | B2 * | 2/2008 | Preisner et al. ......... | 477/80 |
| 7,670,256 | B2 * | 3/2010 | Winkelmann et al. ... | 477/5 |
| 8,056,663 | B2 * | 11/2011 | Schoenek ................ | 180/65.6 |
| 8,170,760 | B2 * | 5/2012 | Sato et al. .............. | 701/54 |
| 8,608,615 | B2 * | 12/2013 | Fuechtner ............... | 477/3 |
| 8,696,505 | B2 * | 4/2014 | Lee et al. ................ | 475/5 |
| 8,771,143 | B2 * | 7/2014 | Tanba et al. ............ | 477/84 |
| 8,840,523 | B2 * | 9/2014 | Tajima .................... | 477/5 |
| 2003/0051577 | A1 | 3/2003 | Hirt | |
| 2003/0069103 | A1 * | 4/2003 | Ibamoto et al. ......... | 475/5 |

FOREIGN PATENT DOCUMENTS

| | | |
|---|---|---|
| JP | 2003113934 A | 4/2003 |
| JP | 2003-522922 A | 7/2003 |
| JP | 2003237393 A | 8/2003 |
| KR | 10-2005-0048280 A | 5/2005 |
| KR | 1020070061714 A | 6/2007 |
| KR | 1020100088731 A | 8/2010 |

* cited by examiner

*Primary Examiner* — Ha D Ho
(74) *Attorney, Agent, or Firm* — Morgan, Lewis & Bockius LLP

(57) ABSTRACT

A hybrid powertrain for a vehicle may include a first input shaft that may be connected with a first clutch and receives power from an engine, a second input shaft that may be connected with a second clutch and receives the power from the engine, an output shaft that may be aligned in parallel with the second input shaft and has a motor-driven gear of which a rotational force may be restricted, and a motor that has a motor-driving gear at an end of a motor shaft to be tooth-engaged with the motor-driven gear.

13 Claims, 3 Drawing Sheets

HYBRID POWERTRAIN FOR VEHICLE

CROSS-REFERENCE TO RELATED APPLICATION

The present application claims priority to Korean Patent Application No. 10-2012-0025835, filed on Mar. 14, 2012, the entire contents of which is incorporated herein for all purposes by this reference.

BACKGROUND OF THE INVENTION

1. Field of the Invention

The present disclosure relates to a hybrid powertrain that improves fuel efficiency and convenience of mounting a motor by adding a hybrid structure to a manual shifting mechanism of a double clutch transmission.

2. Description of Related Art

Recently, it is increasingly necessary to improvement fuel efficiency of vehicles in order to cope with high oil price and environmental restriction of $CO_2$ and environmental vehicles of which the amount of noxious exhaust gases is reduced and the fuel efficiency is improved, such as an electric vehicle or a hybrid vehicle, have been continuously researched and developed.

However, for electric vehicles, since the battery or the motor that is the important part for driving a vehicle is very expensive, the price is higher than common vehicles using fossil fuel so that environmental vehicles are not popularized.

Under the present situation, it may be the best to improve efficiency of internal combustion engines or increase power transmission efficiency of powertrain systems, as the best practical measures for improving fuel efficiency of vehicles.

On the other hand, a transmission of which the efficiency of the driving system is the highest is the manual transmission and a double clutch transmission (DCT) base on the manual transmission also has high power transmission efficiency relatively to an automatic transmission or a CVT (Continuously Variable Transmission).

As described above, it is possible to improve the fuel efficiency of common vehicles equipped with an internal combustion engine, when using a hybrid type of transmission implemented by combining a motor with a DCT having high efficiency.

FIG. 1 shows a hybrid type of transmission implemented by combining a motor with a transmission, in which a motor 3 is disposed between an engine 1 and a transmission 2 and power from the engine 1 is transmitted to the transmission 3 through the motor 3, or power for operating the transmission 2 is transmitted only by the motor 3, with the power from the engine 1 cut.

The structure shown in the figure, however, has a problem in that the overall length L of the engine and the transmission increases because the motor is disposed between the engine and the transmission. Therefore, it doesn't matter when the entire front-rear length of the transmission is small, but when the length of the transmission is large, it is difficult to mount a motor.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hybrid powertrain that improves fuel efficiency by adding a hybrid structure to a manual shifting mechanism of a double clutch transmission and a hybrid powertrain in which a motor can be combined with a transmission regardless of the overall length of an engine and the transmission.

In an aspect of the present invention, a hybrid powertrain for a vehicle may include a first input shaft that is connected with a first clutch and receives power from an engine, a second input shaft that is connected with a second clutch and receives the power from the engine, an output shaft that is aligned in parallel with the second input shaft and may have a motor-driven gear of which a rotational force is restricted, and a motor that may have a motor-driving gear at an end of a motor shaft to be tooth-engaged with the motor-driven gear.

The motor is disposed at a side of a speed change gear.

The first input shaft and the second input shaft are disposed in parallel with each other at both longitudinal sides of the output shaft, a virtual line connecting centers of the first input shaft, the output shaft, and the second input shaft forms a V-shape, and the motor is disposed in an inner space of the V-shape formed between the first input shaft and the second input shaft.

The motor and the motor shaft are arranged in a longitudinal direction of the output shaft.

The motor is disposed within the entire length of a speed change gear.

A damper is disposed between the engine and the speed change gear.

In another aspect of the present invention, a hybrid powertrain for a vehicle, may include a double clutch that may include a first clutch and a second clutch coaxially disposed to receive a rotational force from an engine and selectively transmits or cuts the rotational force from the engine to any one of the first clutch and the second clutch, a first input shaft that is connected with the first clutch and receives the rotational force from the engine, a second input shaft that is connected with the second clutch and receives the rotational force from the engine, an output shaft that is disposed in parallel with the first input shaft and the second input shaft and equipped with a motor-driven gear of which rotational force is restricted, a speed change gear that may include a plurality of pairs of gears having different transmission gear ratio, tooth-engaged with each other, and fitted on the first input shaft, the second input shaft, and the output shaft, and shifts the rotational force, which is transmitted from the input shaft and the second input shaft, for a plurality of stages and transmits the rotational force to the output shaft by selecting a pair of gears to fit a traveling speed of the vehicle by using a synchronizing device, and a motor equipped with a motor-driving gear at an end of a motor shaft to be tooth-engaged with the motor-driven gear.

Odd-numbered stage gears are fitted on the first input shaft, even-numbered stage gears are fitted on the second input shaft, shift gears are fitted on the output shaft for shifting by being engaged with the odd-numbered stage gears and the even-numbered stage gears, and the motor-driven gear is fitted on an end of the output shaft which is connected to driving wheels from the shift gears.

A reverse-driving gear is fitted on the second input shaft, opposite to the first stage gear fitted on the first input shaft, a reverse-shifting gear engaged with a first stage gear of the odd-numbered stage gears is fitted on the output shaft, a reverse idler shaft is disposed in parallel with the second input shaft and the output shaft, and a reverse idler gear is rotatably fitted on the reverse idler shaft to be engaged with the reverse-driving gear and the reverse-shifting gear.

A damper that absorbs torsional vibration of the engine is disposed between the engine and the speed change gear.

The motor is disposed at a side of a speed change gear.

The first input shaft and the second input shaft are disposed in parallel with each other at both longitudinal sides of the output shaft, a virtual line connecting centers of the first input shaft, the output shaft, and the second input shaft forms a V-shape, and the motor is disposed in an inner space of the V-shape formed between the first input shaft and the second input shaft.

The motor and the motor shaft are arranged in a longitudinal direction of the output shaft.

The motor is disposed within the entire length of a speed change gear.

A damper is disposed between the engine and the speed change gear.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
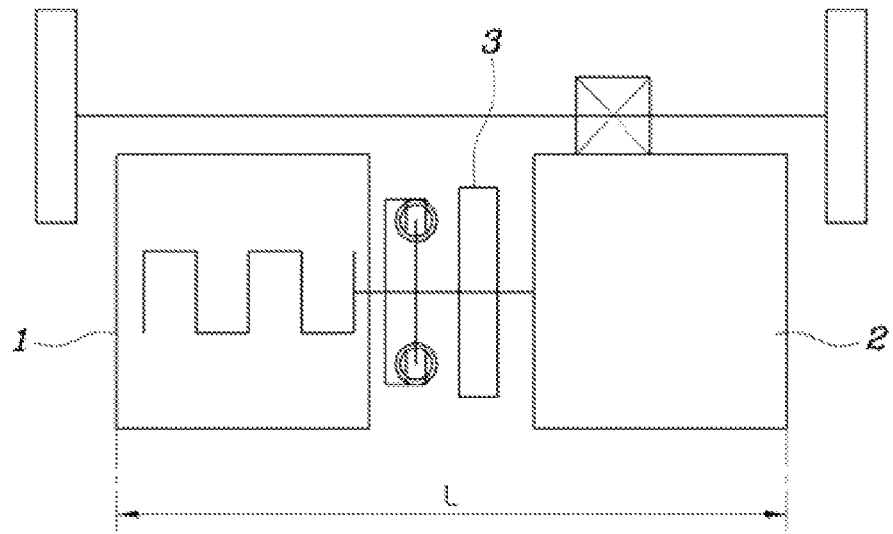
FIG. 1 is a diagram illustrating the arrangement structure of a motor in a hybrid vehicle of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Preferred embodiments of the present invention are described hereafter in detail with the accompanying drawings.

Referring to FIGS. 2 to 6, a hybrid powertrain according to an exemplary embodiment of the present invention includes, a double clutch DC that includes a first clutch C1 and a second clutch coaxially disposed to receive a rotational force from an engine 10 and selectively transmits or cuts the rotational force from the engine to any one of the first clutch C1 and the second clutch C2, a first input shaft INPUT1 that is connected with the first clutch C1 and receives a rotational force from the engine 10, a second input shaft INPUT2 that is connected with the second clutch C2 and receives the rotational force from the engine 10, an output shaft OUTPUT that is disposed in parallel with the first input shaft INPUT1 and the second input shaft INPUT2 and equipped with a motor-driven gear 76 of which rotational force is restricted, a speed change gear 30 that includes a plurality of pairs of gears having different transmission gear ratio, tooth-engaged with each other, and fitted on the first input shaft INPUT1, the second input shaft INPUT 2, and the output shaft OUTPUT, and shifts the rotational force, which is transmitted from the input shaft INPUT1 and the second input shaft INPUT 2, for a plurality of stages and transmits the rotational force to the output shaft OUTPUT by selecting a pair of gears to fit the traveling speed by using a synchronizing device 50, a motor 70 equipped with a motor-driving gear 74 at an end of a motor shaft 72 to be engaged with the motor-driven gear 76.

The first clutch C1 and the second clutch C2 may be friction clutches and a pressing force applied to the clutches may be controlled a hydraulic pressure.

That is, the mechanism of an automated manual transmission in which shift gears forming the stages are disposed in a pair, respectively, on the first input shaft INPUT1, the second input shaft INPUT2, and the output shaft OUTPUT, which are arranged in parallel, and which shifts by operating the shift gears with the synchro-mesh type of synchronizing device 50, is implemented.

As the structure of a double clutch composed of the first clutch C1 disposed to transmit the power from the engine 10 to the first input shaft INPUT1 and the second clutch C2 disposed to transmits the power from the engine 10 to the second input shaft INPUT 2 is applied to the configuration described above, the power from the engine 10, which is transmitted to the first input shaft INPUT1 or the second input shaft INPUT 2, is transmitted to the output shaft OUTPUT.

As a result, when a vehicle travels with the first clutch C1 engaged, the second clutch C2 is disengaged while the gear of a high stage or a low stage engaged with the second clutch C2 is engaged. Therefore, when the optimal shift point is reached while the vehicle travels with the first clutch C1 engaged, the first clutch C1 is disengaged and the second clutch C2 is engaged, such that the gear is shifted.

Accordingly, since shifting is performed by the double clutch transmission having the manual shifting mechanism, the power transmission efficiency is improved in comparison to the automatic transmission or the continuously variable transmission of the related art, thereby improving fuel efficiency of the vehicle.

In particular, according to an exemplary embodiment of the present invention, the power from the engine 10 is transmitted to the output shaft OUTPUT by shifting performed by the manual shifting mechanism, as described above, a rotational force can be further provided to the output shaft OUTPUT by the rotational power of the motor 70. Therefore, both of the engine 10 and the motor 70 are operated to rotate the output shaft OUTPUT or the output shaft OUTPUT can be rotated only by the driving force of the motor 70 so that the fuel efficiency is improved by the manual shifting mechanism of the DCT while the fuel efficiency is additionally improved by the hybrid type using the motor 70.

Figure 2:
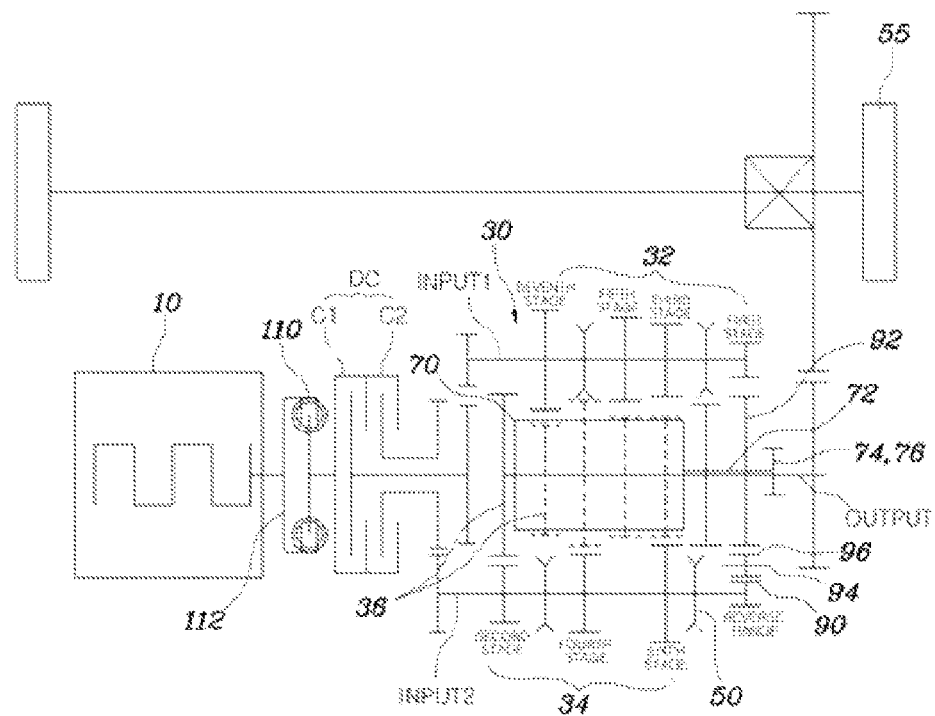
FIG. 2 is a diagram illustrating the structure of a DCT and the arrangement structure of a motor in a hybrid powertrain according to an exemplary embodiment of the present invention.
Figure 3:
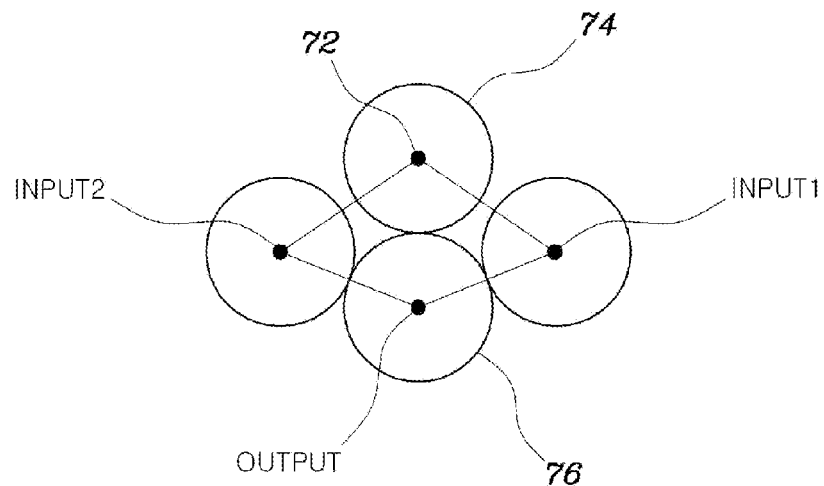
FIG. 3 is a diagram schematically showing the arrangement relationship of a first input shaft, a second input shaft, an output shaft, and a motor shaft shown in FIG. 2, seen from a side.

FIG. 2 is a diagram schematically showing the structure of a hybrid power train according to an exemplary embodiment of the present invention and FIG. 3 is a diagram showing the arrangement relationship of the first input shaft INPUT1, the second input shaft INPUT2, the output shaft OUTPUT, and the motor shaft 72 shown in FIG. 2.

Referring to FIG. 2, the motor 70 may be disposed at a side of the speed change gear 30. Further, the motor 70 and the motor shaft 72 may be arranged in the longitudinal direction of the output shaft OUTPUT.

In detail, when the engine 10 and the speed change gear 30 are disposed in the left-right direction of a vehicle, the motor 70 may be disposed at the side arranged in the circumferential directions of the shafts in the speed change gear 30. Preferably, the motor 70 may be disposed above or under the speed change gear 30, and more preferably, the motor-driving gear 74 fitted on the motor shaft 72 is tooth-engaged with the motor-driven gear 76 fitted on the output shaft OUTPUT such that the motor is disposed at the side arrange in the circumferential direction of the output shaft OUTPUT, in parallel with the output shaft OUTPUT.

The motor 70 may be disposed within the entire length of the speed change gear 30. The entire length of the speed change gear 30 may be the length of the speed change gear 30 in the same direction as the left-right width direction of the vehicle, when seen from the figure.

That is, as the motor is disposed at the side within the entire length of the speed change gear, the motor 70 is integrated with the transmission and the space for disposing the motor 70 between the engine 10 and the transmission is not needed so that the overall length of the transmission and the engine 10 in the left-right width direction is reduced. Therefore, the motor 70 can be mounted regardless of the left-right length of the engine 10 or the transmission so that the motor 70 and the parts of the existing driving system can be more conveniently mounted in the vehicle.

Referring to FIG. 3, according to an exemplary embodiment of the present invention, the first input shaft INPUT1 and the second input shaft INPUT2 are disposed in parallel with each other at both sides of the output shaft OUTPUT while a virtual line connecting the centers of the first input shaft INPUT1, the output shaft OUTPUT, and the second input shaft INPUT2 forms a V-shape, and the motor can be disposed in a narrow space between the first input shaft INPUT1 and the second input shaft INPUT2.

That is, when seen from the figure, since the first input shaft INPUT1 and the second input shaft INPUT2 are disposed at both sides of the output shaft OUTPUT at the lowermost position, above the output shaft OUTPUT, the gap between the upper portions of the first input shaft INPUT1 and the second input shaft INPUT2 naturally decreases so that the first input shaft INPUT1, the output shaft OUTPUT, and the second input shaft INPUT2 are arranged in a V-shape. Further, the motor shaft 72 is disposed between the decreased gap between the upper portions of the first input shaft INPUT1 and the second input shaft INPUT2, a virtual line forming a diamond shape is formed by connecting the four shafts. Therefore, the size of the transmission is minimized by making the connection structure of the first input shaft INPUT1, second input shaft INPUT2, output shaft OUTPUT, and motor shaft 72 dense and compact.

Meanwhile, as shown in FIG. 2, an odd-numbered stage gear 32 is fitted on the first input shaft INPUT1, an even-numbered stage gear 34 is fitted on the second input shaft INPUT2, a shift gear 36 is fitted on the output shaft OUTPUT for shifting by being engaged with the odd-numbered stage gear 32 and the even-numbered stage gear 34, and the motor-driven gear 76 may be fitted on the end of the output shaft OUTPUT which is connected to the driving wheels 55 from the shift gear 36.

The motor-driven gear 76 rotates with the output shaft and is tooth-engaged with the motor-driving gear 74 so that it is rotated by the rotational power from the motor 70. Further, the odd-numbered stage gear 32 and the even-numbered stage gear 34 are not limited to the configuration described above and may be changed into various structures in accordance with the designing condition of the transmission gear ratio of the gears.

For reference, the shift gears are provided for the first stage to the seventh stage, in which a reverse range is added and the synchronizing device 50 disposed between the first stage gear and the third stage gear of the first input shaft INPUT1, the fifth stage gear and the seventh stage gear of the first input shaft INPUT1, the second stage gear and the fourth stage gear of the second input shaft INPUT2, and the sixth stage gear of the second input shaft INPUT and a reverse gear 90.

Further, according to an exemplary embodiment of the present invention, the reverse-driving gear 90 may be fitted on the second input shaft INPUT2, opposite to the first stage gear fitted on the first input shaft INPUT1, a reverse-shifting gear 92 engaged with the first stage gear may be fitted on the output shaft OUTPUT, a reverse idler shaft 94 may be disposed in parallel with the second input shaft INPUT2 and the output shaft OUTPUT, and a reverse idler gear 96 may be rotatably fitted on the reverse idler shaft 94 to be engaged with the reverse-driving gear 90 and the reverse-shifting gear 92.

Therefore, when the synchronizing device 50 is connected to the reverse-driving gear 90, the rotational force of the a reversing device by the second input shaft INPUT2 is changed in the rotational direction by the reverse idler gear 96 and transmitted to the reverse-shifting gear 92, such that reverse shifting is implemented.

Meanwhile, a damper 110 that absorbs torsional vibration of the rotary shaft of the engine 10 may be disposed between the engine 10 and the speed change gear 30.

As a preferable example, the damper 110 may be mounted on a flywheel 112, the flywheel 112 may have a structure in which a first rotary element and a second rotary element can rotate relatively to each other, and the damper 110 may be disposed between the first rotary element and the second rotary element. The damper 110 may have a spring structure.

Therefore, it is possible to provide a stable rotational inertia force to the flywheel 112 by absorbing torsional vibration due to a shift shock in the transmission, in addition to the torsional vibration due to the explosion stroke of the engine, using the damper 110.

The operation and effect of the present invention are described in detail with reference to FIGS. 4-6.

Figure 4:
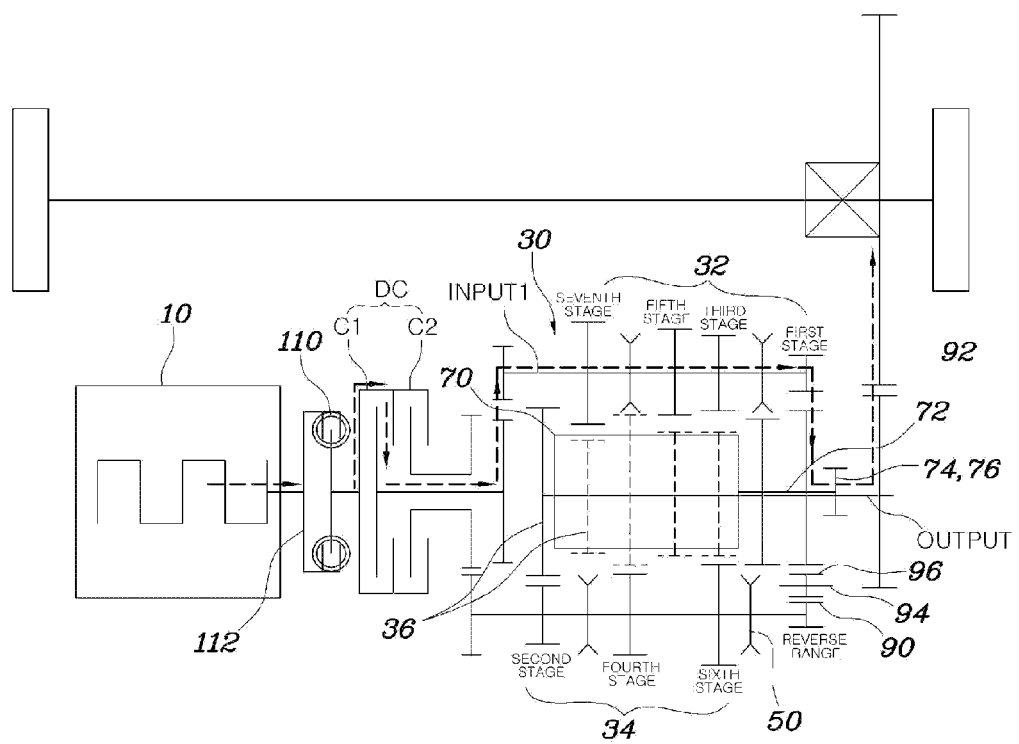
FIG. 4 is a diagram illustrating power flow from an engine shown in FIG. 2.

FIG. 4 shows power flow from the engine 10, in which the power from the engine 10 is transmitted to the first input shaft INPUT1 through the first clutch C1, and the power is shifted to fit the transmission gear ratio of the first stage through the first stage gear and then outputted to the output shaft OUTPUT, such that first stage start is achieved.

In this operation, the motor 70 is not operated and a rotational force is supplied to the driving wheels only by the driving force of the engine 10.

Figure 5:
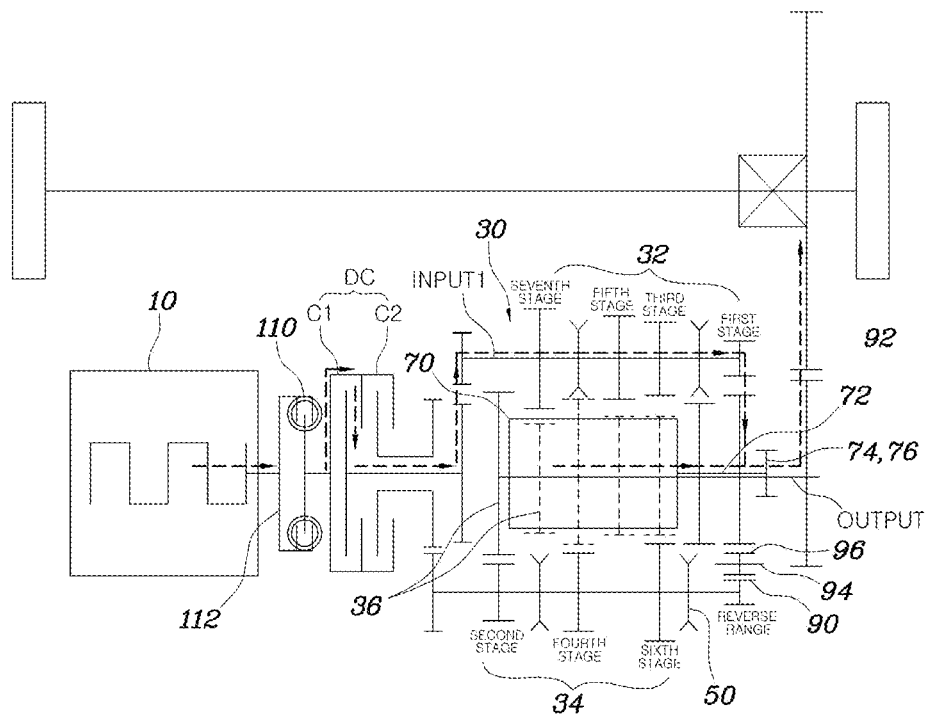
FIG. 5 is a diagram illustrating power flow from the engine and the motor shown in FIG. 2.

FIG. 5 shows power flow when both of the engine 10 and the motor 70 are used, in which with the first stage start of the engine 10 described above, the power from the motor 70 is transmitted to the motor-driving gear 74 to be rotated through the motor shaft 72, and the power is transmitted to the motor-driven gear 76 engaged with the motor-driving gear 74 and then outputted to the output shaft OUTPUT.

That is, the rotating force from the engine 10 and the rotating force from the motor 70 are combined and transmitted to the output shaft OUTPUT, such that the transmission efficiency of the power transmitted to the driving wheels from the engine 10 is improved and fuel efficiency is correspondingly improved.

Figure 6:
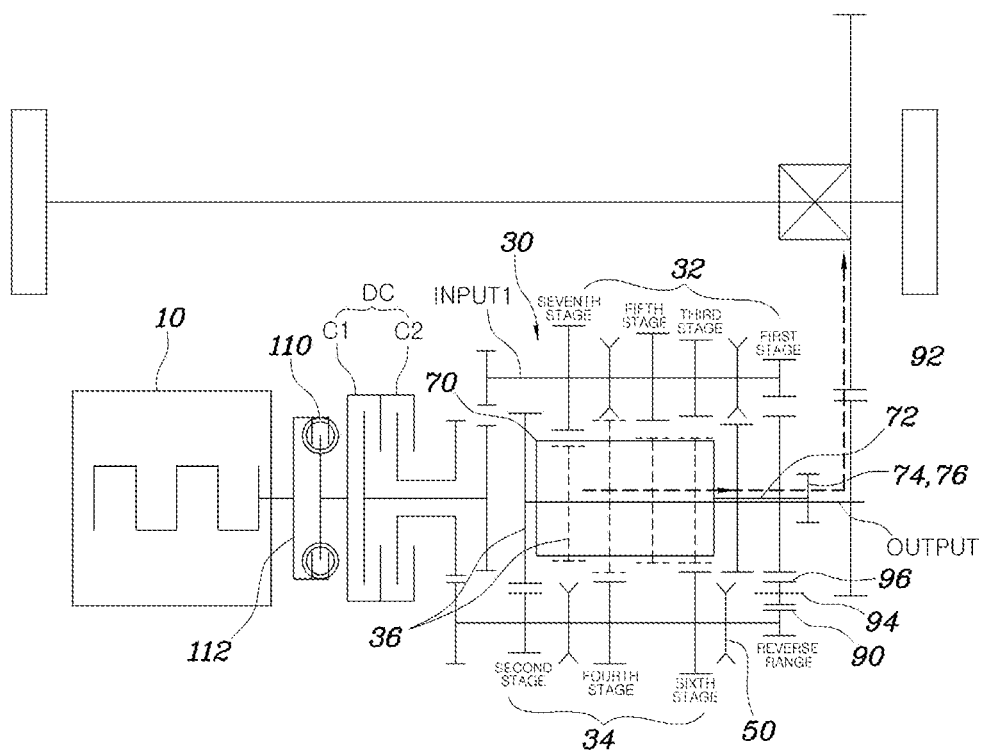
FIG. 6 is a diagram illustrating power flow from the motor shown in FIG. 2.

FIG. 6 shows power flow from the motor 70, in which the power from the motor 70 is transmitted to the motor-driving gear 74 to be rotated through the motor shaft 72, and the power is transmitted to the motor-driven gear 76 engaged with the motor-driving gear 74 and then directly outputted to the output shaft OUTPUT, such that first stage start is achieved.

That is, as the output shaft OUTPUT is supplied with a rotational force only from the driving force of the motor 70, without using the engine 10 under some traveling conditions of a vehicle, power consumption of the vehicle is reduced and the fuel efficiency is improved.

The power flow at other stages is implemented in the same way as the power flow described above, such that the detailed description is not provided.

According to an exemplary embodiment of the present invention, since a motor electrically generating power is combined with a double clutch transmission having high power transmission efficiency of a transmission and transmits power to an output, it is possible to improve fuel efficiency by reducing power consumption of a vehicle.

Further, it is possible to implement sporty shifting and increase the commercial value of a vehicle by applying a double clutch transmission that is efficiently and directly engaged with an engine to a hybrid vehicle.

In particular, as a motor is disposed at a side of the transmission, not between the engine and the transmission, the overall length of the engine and the transmission is not increased, such that it is possible to more conveniently mount not only the transmission, but the motor in a vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid powertrain for a vehicle, comprising:
   a first input shaft connected with a first clutch and receiving power from an engine;
   a second input shaft connected with a second clutch and receiving power from the engine;
   an output shaft aligned in parallel with the second input shaft and having a motor-driven gear of which a rotational force is restricted; and
   a motor having a motor-driving gear at an end of a motor shaft to be tooth-engaged with the motor-driven gear, wherein
   the first input shaft and the second input shaft are disposed in parallel with each other at both sides of the output shaft,
   a first virtual line connecting centers of the first input shaft, the output shaft, and the second input shaft forms a V-shape, and
   the motor is disposed in a space between upper portions of the first input shaft and the second input shaft so that a second virtual line connecting the centers of the first input shaft, output shaft, and second input shaft and a center of the motor shaft forms a diamond shape.

2. The hybrid powertrain of claim 1, wherein the motor is disposed at a side of a speed change gear.

3. The hybrid powertrain of claim 1, wherein the motor and the motor shaft is arranged in a longitudinal direction of the output shaft.

4. The hybrid powertrain of claim 1, wherein the motor is disposed within the entire length of a speed change gear.

5. The hybrid powertrain of claim 1, wherein a damper is disposed between the engine and a speed change gear.

6. A hybrid powertrain for a vehicle, comprising:
   a double clutch including a first clutch and a second clutch coaxially disposed to receive a rotational force from an engine and selectively transmitting or cutting the rotational force from the engine to any one of the first clutch and the second clutch;
   a first input shaft connected with the first clutch and receiving the rotational force from the engine;
   a second input shaft connected with the second clutch and receiving the rotational force from the engine;
   an output shaft disposed in parallel with the first input shaft and the second input shaft and equipped with a motor-driven gear of which rotational force is restricted;
   a speed change gear including a plurality of pairs of gears having different transmission gear ratio, tooth-engaged with each other, and fitted on the first input shaft, the second input shaft, and the output shaft, and shifting the rotational force, which is transmitted from the input shaft and the second input shaft, for a plurality of stages and transmitting the rotational force to the output shaft by selecting a pair of gears to fit a traveling speed of the vehicle by using a synchronizing device; and
   a motor equipped with a motor-driving gear at an end of a motor shaft to be tooth-engaged with the motor-driven gear, wherein
   the first input shaft and the second input shaft are disposed in parallel with each other at both sides of the output shaft,
   a first virtual line connecting centers of the first input shaft, the output shaft, and the second input shaft forms a V-shape, and the motor is disposed in a space between upper portions of the first input shaft and the second input shaft so that a second virtual line connecting the centers of the first input shaft, output shaft, and second input shaft and a center of the motor shaft forms a diamond shape.

7. The hybrid powertrain of claim 6, wherein odd-numbered stage gears are fitted on the first input shaft, even-numbered stage gears are fitted on the second input shaft, shift gears are fitted on the output shaft for shifting by being engaged with the odd-numbered stage gears and the even-numbered stage gears, and the motor-driven gear is fitted on an end of the output shaft which is connected to driving wheels from the shift gears.

8. The hybrid powertrain of claim 7, wherein a reverse-driving gear is fitted on the second input shaft, opposite to the first stage gear fitted on the first input shaft, a reverse-shifting gear engaged with a first stage gear of the odd-numbered stage gears is fitted on the output shaft, a reverse idler shaft is disposed in parallel with the second input shaft and the output shaft, and a reverse idler gear is rotatably fitted on the reverse idler shaft to be engaged with the reverse-driving gear and the reverse-shifting gear.

9. The hybrid powertrain of claim 6, wherein a damper that absorbs torsional vibration of the engine is disposed between the engine and the speed change gear.

10. The hybrid powertrain of claim 6, wherein the motor is disposed at a side of the speed change gear.

11. The hybrid powertrain of claim 6, wherein the motor and the motor shaft is arranged in a longitudinal direction of the output shaft.

12. The hybrid powertrain of claim 6, wherein the motor is disposed within the entire length of the speed change gear.

13. The hybrid powertrain of claim 6, wherein a damper is disposed between the engine and the speed change gear.

* * * * *